United States Patent
Chen et al.

(10) Patent No.: US 12,143,014 B2
(45) Date of Patent: Nov. 12, 2024

(54) VOLTAGE CONVERTER HAVING SWITCHED CAPACITOR CIRCUITS

(71) Applicant: Silergy Semiconductor Technology (Hangzhou) LTD, Hangzhou (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 250 days.

(21) Appl. No.: 17/590,128

(22) Filed: Feb. 1, 2022

(65) Prior Publication Data

US 2022/0255429 A1  Aug. 11, 2022

(30) Foreign Application Priority Data

Feb. 8, 2021 (CN) .................. 202110182208.X

(51) Int. Cl.
*H02M 3/158* (2006.01)
*H02M 3/07* (2006.01)

(52) U.S. Cl.
CPC ............. *H02M 3/158* (2013.01); *H02M 3/07* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56;
(Continued)

(56) References Cited

U.S. PATENT DOCUMENTS 7,038,436 B2     5/2006  Goto et al.
10,468,965 B2 *  11/2019  Liu ..................... H02M 3/158
(Continued)

FOREIGN PATENT DOCUMENTS

DE     102006060011 A1    7/2008

*Primary Examiner* — Jeffrey A Gblende

(57) ABSTRACT

A voltage converter can include: an input end configured to receive an input voltage; an output end configured to generate an output voltage; N switched capacitor circuits sequentially coupled in series between the input end and the output end, where N is a positive integer greater than or equal to 2; where each switched capacitor circuit comprises a switch circuit and a flying capacitor, and at least the flying capacitor of an i-th switched capacitor circuit is configured as an output capacitor of an (i−1)-th switched capacitor circuit, where i is a positive integer that is greater than or equal to 2 and less than or equal to N; and a first energy storage element coupled to the output end.

14 Claims, 11 Drawing Sheets

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069
See application file for complete search history.

(56) References Cited

U.S. PATENT DOCUMENTS

| | | | |
|---|---|---|---|
| 11,043,899 B2* | 6/2021 | Webb | H02M 3/07 |
| 11,626,800 B2* | 4/2023 | Cannillo | H02M 3/1584 |
| | | | 323/271 |
| 2020/0099302 A1 | 3/2020 | Webb et al. | |
| 2021/0175805 A1* | 6/2021 | Mercer | H02M 1/08 |

* cited by examiner

VOLTAGE CONVERTER HAVING SWITCHED CAPACITOR CIRCUITS

RELATED APPLICATIONS

This application claims the benefit of Chinese Patent Application No. 202110182208.X, filed on Feb. 8, 2021, which is incorporated herein by reference in its entirety.

FIELD OF THE INVENTION

The present invention generally relates to the field of power electronics, and more particularly to voltage converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With the development of society, energy shortages have become problematic. Power electronics technology has developed by leaps and bounds in recent years, and efficient voltage converters are an indispensable part of energy utilization. One example high-efficiency voltage converter adopts the form of a charge pump.

Figure 1:
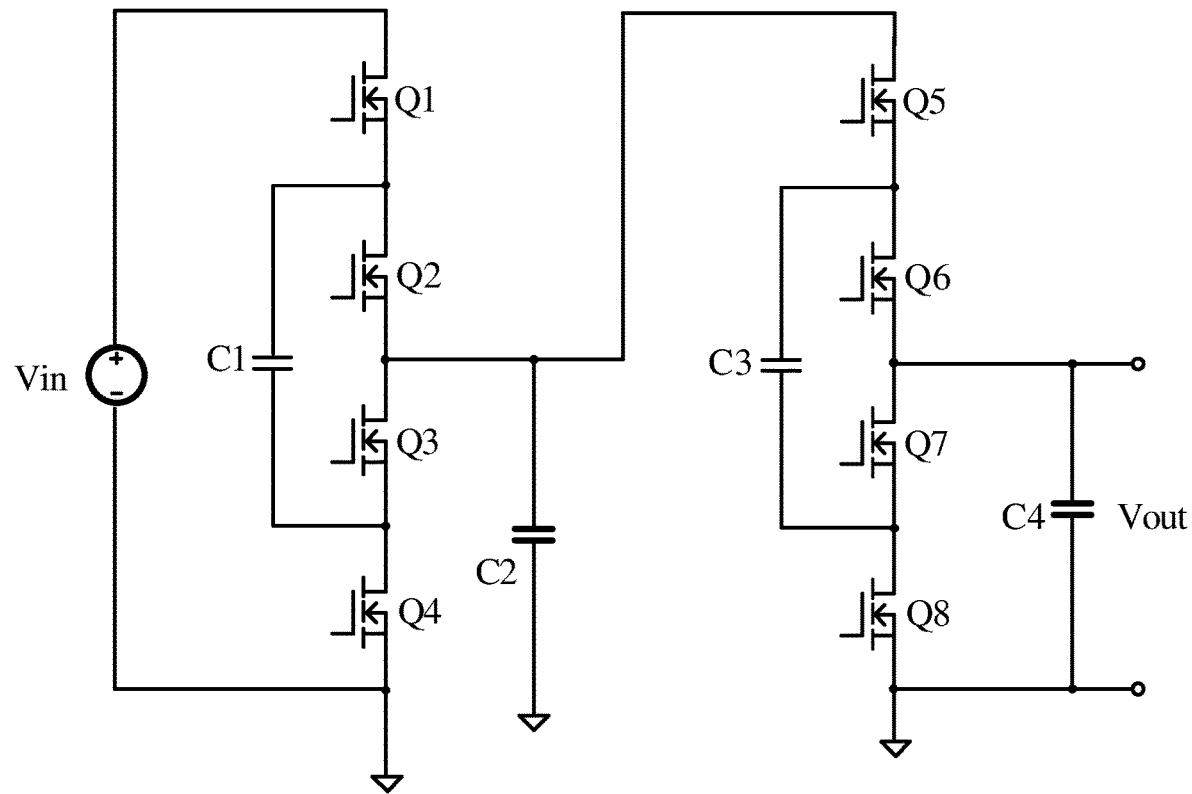
FIG. 1 is a schematic diagram of an example voltage converter.

Referring now to FIG. 1, shown is a schematic diagram of an example voltage converter. In this example, the voltage converter can include power switches Q1-Q8 and energy storage capacitors C1-C4, and power switches Q1-Q4 can connect in series in sequence between a high potential terminal of an input terminal of the voltage converter and a ground potential to receive input voltage Vin. Energy storage capacitor C1 can be coupled to a common terminal of power switches Q1 and Q2 and a common terminal of power switches Q3 and Q4. Energy storage capacitor C2 can be coupled between a common terminal of power switches Q2 and Q3 and the ground potential. Further, power switches Q5 to Q8 can be sequentially connected in series between a common terminal of power switches Q2 and Q3 and the ground potential. Also, storage capacitor C3 can be coupled between a common terminal of power switches Q5 and Q6 and a common terminal of power switches Q7 and Q8, and storage capacitor C4 can be coupled between a common terminal of power switches Q6 and Q7 and the ground potential. Here, the high potential terminal of the input terminal of the voltage converter is a common terminal of power switches Q6 and Q7, and output voltage Vout can be generated at the output terminal of the voltage converter. The voltage converter shown in FIG. 1 can efficiently achieve a 4:1 voltage conversion; that is, the ratio of input voltage Vin to output voltage Vout is 4:1. However, 4 energy storage capacitors and 8 power switches are required in this case, and when the voltage converter shown in FIG. 1 is packaged in a chip, 7 pins are required. As such, the number of devices and pins in the voltage converter is relatively large in this case, which increases costs.

In particular embodiments, a voltage converter provided can include: an input end configured to receive an input voltage; an output end configured to generate an output voltage; N switched capacitor circuits sequentially connected in series between the input end and the output end, and a first energy storage element coupled to the output end. Each switched capacitor circuit can include a switch circuit and a flying capacitor, and the flying capacitor of at least the i-th switched capacitor circuit may be shared as an output capacitor of an (i−1)-th switched capacitor circuit, N≥2, 2≤i≤N. Further, the switch circuit of the (i−1)-th switched capacitor circuit and the switch circuit of the i-th switched capacitor circuit can share at least part of the power switches. For example, the switch circuits of the i-th switched capacitor circuit can multiplex part of the power switches in the switch circuit of the (i–1)-th switched capacitor circuit. Optionally, the switch circuit of the i-th switched capacitor circuit can multiplex all the power switches in the switch circuit of the i-th switched capacitor circuit.

In addition, the flying capacitors of the i-N switched capacitor circuits and the first energy storage element can be coupled in series and shared as the output capacitor of the (i–1)-th switched capacitor circuit. Optionally, the flying capacitor of the i-th switched capacitor circuit or the flying capacitors of the i~m switched capacitor circuit can be coupled in series, or the flying capacitors of the i~N switched capacitor circuit connected in series with the first energy storage is/are shared as the output capacitor of the (i–1)-th switched capacitor circuit, $i+1 \leq m \leq N$. Further, in each switching cycle, the N switched capacitor circuits may operate in a switched capacitor mode in sequence. Optionally, in each switching cycle, the 1st to Nth switched capacitor circuits can operate sequentially in a switched capacitor mode. Optionally, in each switching cycle, the Nth to 1st switched capacitor circuits may operate sequentially in a switched capacitor mode. Further, by controlling the switch states of the power switches of the switch circuit in each switched capacitor circuit, the ratio of the output voltage to the input voltage is $1/2^N$ or $2^N$.

Figure 2:
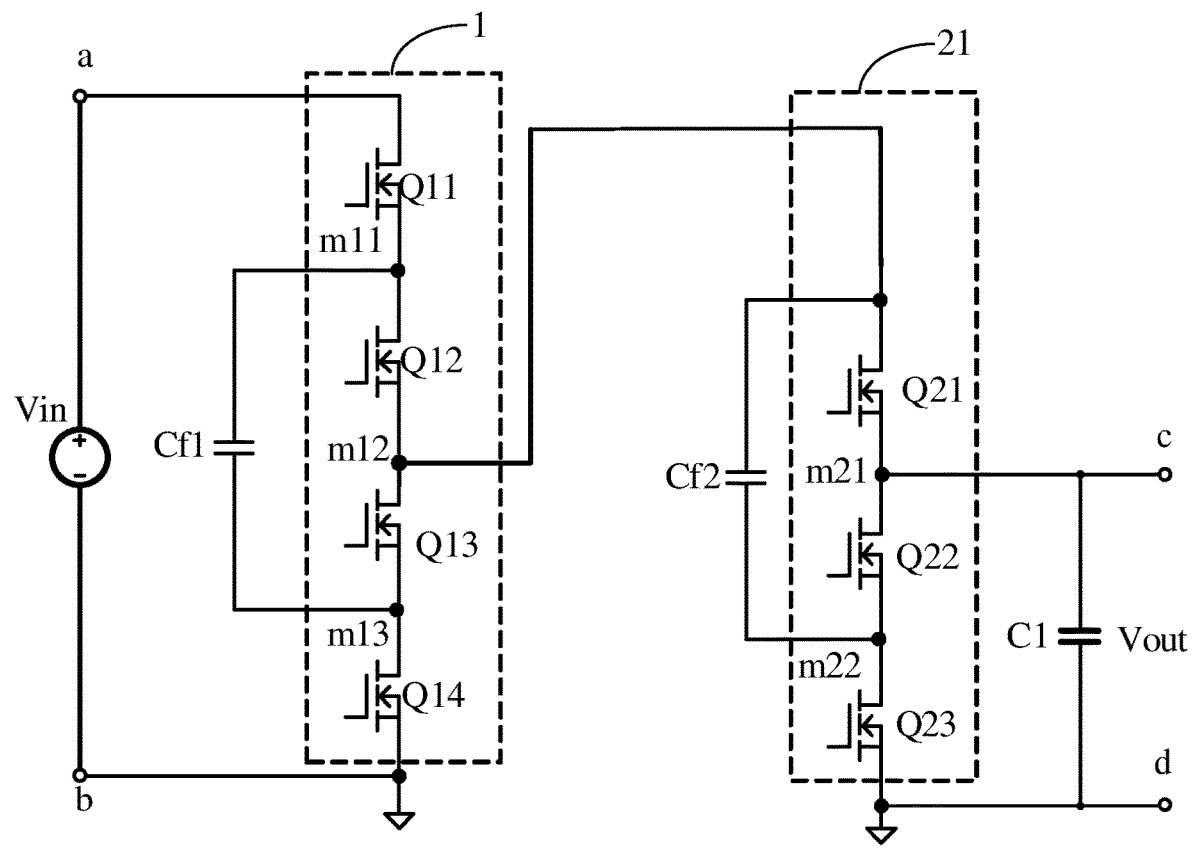
FIG. 2 is a schematic diagram of a first example voltage converter, in accordance with embodiments of the present invention.

Referring now to FIG. 2, shown is a schematic diagram of a first example voltage converter, in accordance with embodiments of the present invention. This particular example voltage converter can include input end ab, output end cd, two switched capacitor circuits, and first energy storage element C1. The input end can include high potential terminal a and low potential terminal b for receiving input voltage Vin, and the output end can include high potential terminal c and low potential terminal d for generating output voltage Vout. The two switched capacitors circuit can be sequentially connected in series between input end ab and output end cd. Also, first energy storage element C1 can be coupled to output end cd to generate output voltage Vout so as to drive the load. Here, low potential terminal b of the input end and low potential terminal d of the output end may be ground potential terminals.

The first switched capacitor circuit can include flying capacitor Cf1 and switch circuit 1. Switch circuit 1 can include four first power switches Q11, Q12, Q13, and Q14 sequentially connected in series between high potential terminal a and low potential terminal b of the input end, such that three first intermediate nodes m11, m12, and m13 are formed. Flying capacitor Cf1 can connect between first intermediate nodes m11 and m13. Here, the high potential terminal of the output end of the first switched capacitor circuit can be configured as first intermediate node m12. Further, both the low potential terminals of the input end and the output end of the first switched capacitor circuit may be ground potential terminals.

The second switched capacitor circuit can include flying capacitor Cf2 and a switch circuit. The switch circuit of the second switched capacitor circuit can include first switch circuit 21, and first switch circuit 21 can include three second power switches Q21, Q22, and Q23. Second power switches Q21, Q22, and Q23 can be sequentially connected in series between the high potential terminal (e.g., first intermediate node m12) and the low potential terminal of the output end of the first switched capacitor circuit, such that two second intermediate nodes m21 and m22 are formed. Flying capacitor Cf2 can connect between the high potential terminal of the output end of the first switched capacitor circuit (e.g., first intermediate node m12) and second intermediate node m22. Here, the high potential terminal of the output end of the second switched capacitor circuit can be configured as second intermediate node m21. Further, both low potential terminals of the output end and the input end of the second switched capacitor circuit are ground potential terminals. The output end of the second switched capacitor circuit can connect to output end cd.

When the first switched capacitor circuit operates in the switched capacitor mode, second power switch Q22 can be always turned on. In addition, flying capacitor Cf2 connected in series with first energy storage element C1 can be shared as the output capacitor of the first switched capacitor circuit. Further, when the second switched capacitor circuit operates in the switched capacitor mode, the switch circuit of the second switched capacitor circuit can include first switch circuit 21, and multiplex first power switches Q12 and Q13 in switch circuit 1, and the output capacitor of the second switched capacitor circuit can be configured as first energy storage element C1. Further, by controlling the switching states of the first power switch and the second power switch, the voltage conversion between input end ab and output end cd can be realized.

In this embodiment, the voltage converter can also include a control circuit. The control circuit can control the switching states of the first power switch and the second power switch. The switching states of second power switch Q21 and Q23 can be complementary to the switching states of second power switch Q22. Also, the switching states of first power switches Q11 and Q13 can be complementary to the switching states of first power switches Q12 and Q14. Further, the switching states of second power switches Q21 and Q23 may be the same, and the switching states of second power switches Q21 and Q23 can be complementary to the switching states of second power switch Q22. During the conduction period of second power switch Q22, the switching states of first power switches Q11 and Q13 can be same, the switching states of first power switches Q12 and Q14 may be the same, and the switching states of first power switches Q11 and Q13 can be complementary to the switching states of first power switches Q12 and Q14.

In order to prevent the instantaneous short-circuit phenomenon that may be caused by the turn-off delay of the power switches, a dead time can be added between the switching states of the power switches that are complementarily turned on. For example, between the switching states of second power switches Q21 and Q22, the dead time can be inserted, and the dead time can be also inserted between the switching states of first power switches Q11 and Q14, while the other complementary conduction is the same in this case. The power switches of particular embodiments can adopt any suitable electrically controllable switching devices (e.g., metal-oxide-semiconductor field-effect transistor [MOSFET], bipolar junction transistor [BJT], insulated-gate bipolar transistor [IGBT], etc.).

Figure 3:
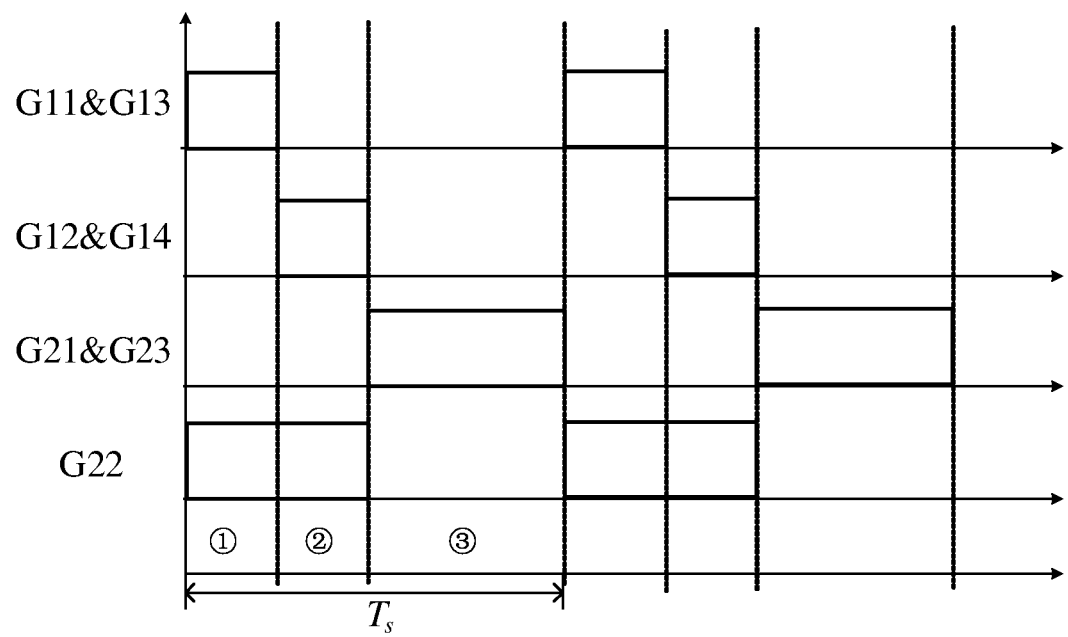
FIG. 3 is a waveform diagram of example operation of the voltage converter in the first example, in accordance with embodiments of the present invention.

Referring now to FIG. 3, shown is a waveform diagram of example operation of the voltage converter in the first example, in accordance with embodiments of the present invention. In this particular example, G11 and G13 are the control signals of first power switches Q11 and Q13, G12 and G14 are the control signals of first power switches Q12 and Q14, G21 and G23 are the control signals of second power switches Q21 and Q23, and G22 is the control signal of second power switch Q22. Switching period Ts can include three intervals ①~③. The operating process of voltage converter in the first embodiment can be described with reference to FIGS. 2 and 3. As shown in FIG. 3, during interval ①, control signals G11, G13, and G22 are high, first power switches Q11 and Q13 and second power switch Q22 can be turned on, and flying capacitor Cf1, flying capacitor Cf2, and first storage energy element C1 can be connected in series to divide input voltage Vin; that is, VCf1+VCf2+VC1=Vin.

During interval ②, control signals G12, G14, and G22 are high, first power switches Q12 and Q14 and second power switch Q22 can be turned on. One terminal of flying capacitor Cf1 can connect to first intermediate node m11, and the other terminal of flying capacitor Cf1 may be grounded. One terminal of flying capacitor Cf2 can connect to first intermediate node m11, the other terminal of flying capacitor Cf2 can connect to one terminal of first energy storage element C1, and the other terminal of first energy storage element C1 can be grounded. That is, the series-connection of flying capacitor Cf2 and first energy storage element C1 can connect in parallel with flying capacitor Cf1, such that voltage VCf1 across flying capacitor Cf1 can be equal to the sum of voltage VCf2 across flying capacitor Cf2 and voltage VC1 across first storage energy element C1, and may also be equal to half the input voltage; that is, VCf1=VCf2+VC1=1/2*Vin. In addition, the output voltage of the first switched capacitor circuit can be equal to the voltage at first intermediate node m12, and the voltage at first intermediate node m12 can be equal to the voltage across flying capacitor Cf1, such that the output voltage of the first switched capacitor circuit can be equal to voltage VCf1 across flying capacitor Cf1; that is, 1/2*Vin.

During interval ③, control signals G21 and G23 are high, and second power switches Q21 and Q23 can be turned on. One terminal of flying capacitor Cf2 can connect to first intermediate node m12, and the other terminal of flying capacitor Cf2 may be grounded. Also, one terminal of first energy storage element C1 can connect to first intermediate node m12, and the other terminal of first energy storage element C1 can be grounded. That is, flying capacitor Cf2 can connect in parallel with first energy storage element C1, such that voltage VCf2 across flying capacitor Cf2 can be equal to voltage VC1 across first energy storage element C1, and may also be equal to one quarter of the input voltage; that is, VCf2=VC1=1/4*Vin. In this example, during each switching cycle, the first switched capacitor circuit and the second switched capacitor circuit may operate in a switched capacitor mode in sequence. The voltage converter can efficiently achieve 4:1 voltage conversion; that is, the ratio of input voltage Vin to output voltage Vout is 4:1. Here, three energy storage elements and 7 power switches are required in the voltage converter, and when the voltage converter is packaged in the chip, only 6 pins may be required, thereby reducing the cost and volume of the circuit.

Figure 4:
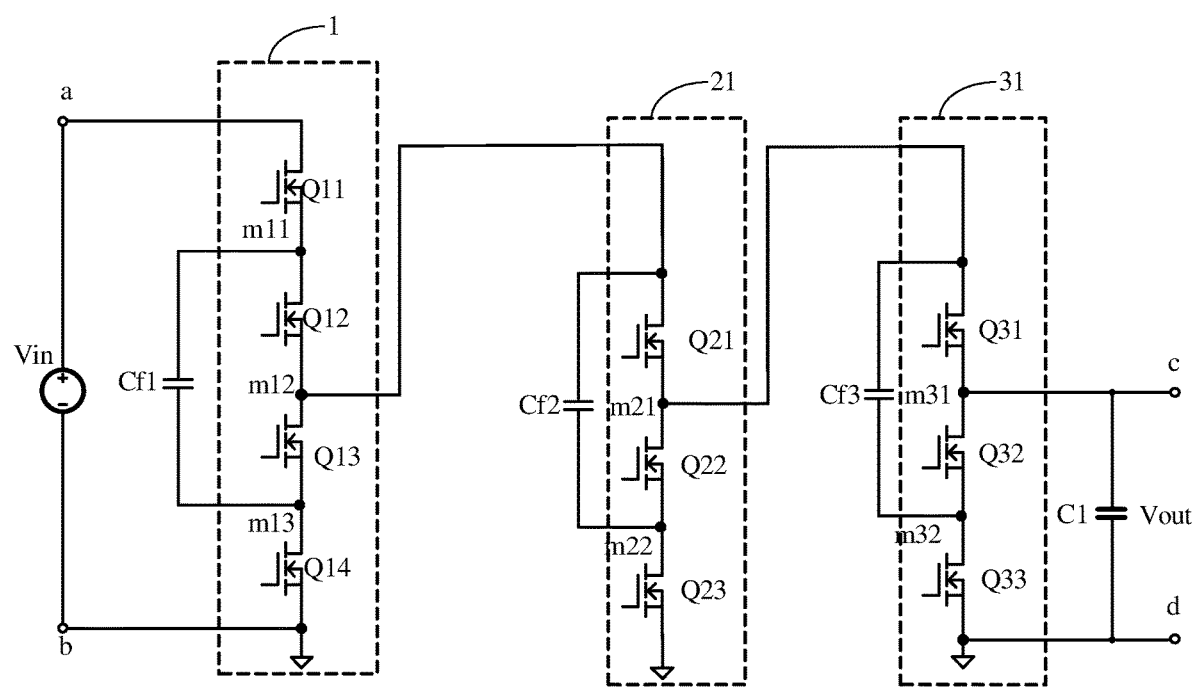
FIG. 4 is a schematic diagram of a second example voltage converter, in accordance with embodiments of the present invention.

Referring now to FIG. 4, shown is a schematic diagram of a second example voltage converter, in accordance with embodiments of the present invention. In this particular example, the voltage converter can include three switched capacitor circuits, and the three switched capacitor circuits may be sequentially connected in series between input terminal ab and output terminal cd. The first switched capacitor circuit can include flying capacitor Cf1 and switch circuit 1. Switch circuit 1 can include four first power switches Q11, Q12, Q13, and Q14. First power switches Q11, Q12, Q13, and Q14 can be sequentially connected in series between high potential terminal a and low potential terminal b of the input end, such that three first intermediate nodes m11, m12, and m13 can be formed. Flying capacitor Cf1 can connect between first intermediate nodes m11 and m13. The high potential terminal of the output end of the first switched capacitor circuit can be configured as first intermediate node m12, and both the low potential terminals of the input end and the output end of the first switched capacitor circuit can be configured as ground potential terminals.

The second switched capacitor circuit can include flying capacitor Cf2 and a switch circuit, and the switch circuit of the second switched capacitor circuit can include first switch circuit 21. First switch circuit 21 can include three second power switches Q21, Q22, and Q23, and second power switches Q21, Q22, and Q23 can be sequentially connected in series between the high potential terminal (e.g., first intermediate node m12) and the low potential terminal of the output end of the first switched capacitor circuit, such that two second intermediate nodes m21 and m22 may be formed. Flying capacitor Cf2 can connect between the high potential terminal of the output end of the first switched capacitor circuit (e.g., first intermediate node m12) and second intermediate node m22. The high potential terminal of the output end of the second switched capacitor circuit can be configured as second intermediate node m21. Optionally, both low potential terminals of the input end and the output end of the second switched capacitor circuit can be configured as ground potential terminals.

The third switched capacitor circuit can include flying capacitor Cf3 and a switch circuit, and the switch circuit of the third switched capacitor circuit can include first switch circuit 31. First switch circuit 31 can include three second power switches Q31, Q32, and Q33, and second power switches Q31, Q32, and Q33 can be sequentially connected in series between the high potential terminal (e.g., second intermediate node m21) and the low potential terminal of the output end of the second switched capacitor circuit, such that two second intermediate nodes m31 and m32 can be formed. Flying capacitor Cf3 can connect between the high potential terminal of the output end of the second switched capacitor circuit (e.g., second intermediate node m21) and second intermediate node m32. Here, the high potential terminal of the output end of the third switched capacitor circuit can be configured as second intermediate node m31. Optionally, both the low potential terminals of the input end and the output end of the third switched capacitor circuit can be configured as ground potential terminals, and the output end of the third switched capacitor circuit can connect to output end cd.

When the first switched capacitor circuit operates in the switched capacitor mode, second power switches Q22 and Q32 can be always turned on. In this way, flying capacitor Cf2, flying capacitor Cf3, and first energy storage element C1 can be connected in series to be configured as the output capacitor of the first switched capacitor circuit. Further, when the second switched capacitor circuit operates in the switched capacitor mode, the switch circuit of the second switched capacitor circuit can include first switch circuit, and multiplex first power switches Q12 and Q13 in switch circuit 1. When second power switch Q32 is always turned on, flying capacitor Cf3 and first energy storage element C1 can be connected in series to be configured as the output capacitor of the second switched capacitor circuit. Further, when the third switched capacitor circuit operates in the switched capacitor mode, the switch circuit of the third switched capacitor circuit may not only include first switch circuit 31, but also can multiplex second power switches Q21 and Q22 in first switch circuit 21. The output capacitor of the third switched capacitor circuit can be configured as first energy storage element C1.

In this example, the voltage converter can further also a control circuit, and the control circuit can control the switching states of the first power switches and the second power switches. In the third switched capacitor circuit, second power switches Q31 and Q32 can be complementarily turned on and off, and second power switches Q33 and Q32 can be complementarily turned on. During the conduction period of second power switch Q32, the switching states of second power switches Q21 and Q23 can be complementary to the switching states of second power switch Q22. During the conduction period of second power switch Q22 in the second switched capacitor circuit, the switching states of first power switches Q11 and Q13 can be complementary to the switching states of first power switches Q12 and Q14.

Further, the switching states of second power switch Q31 and second power switch Q33 may be the same, and the switching states of second power switches Q31 and Q33 can be complementary to the switching state of second power switch Q32. During the conduction period of second power switch Q32, the switching states of second power switch Q21 and the second power switch Q23 may be the same, and the switching states of second power switches Q21 and Q23 can be complementary to the switching states of second power switch Q22. During the conduction period of second power switch Q22, the switching states of first power switch Q11 and first power switch Q13 may be the same, the switching states of first power switch Q12 and first power switch Q14 can be the same, and the switching states of first power switch Q11 and Q13 may be complementary to the switching states of first power switches Q12 and Q14.

Figure 5:
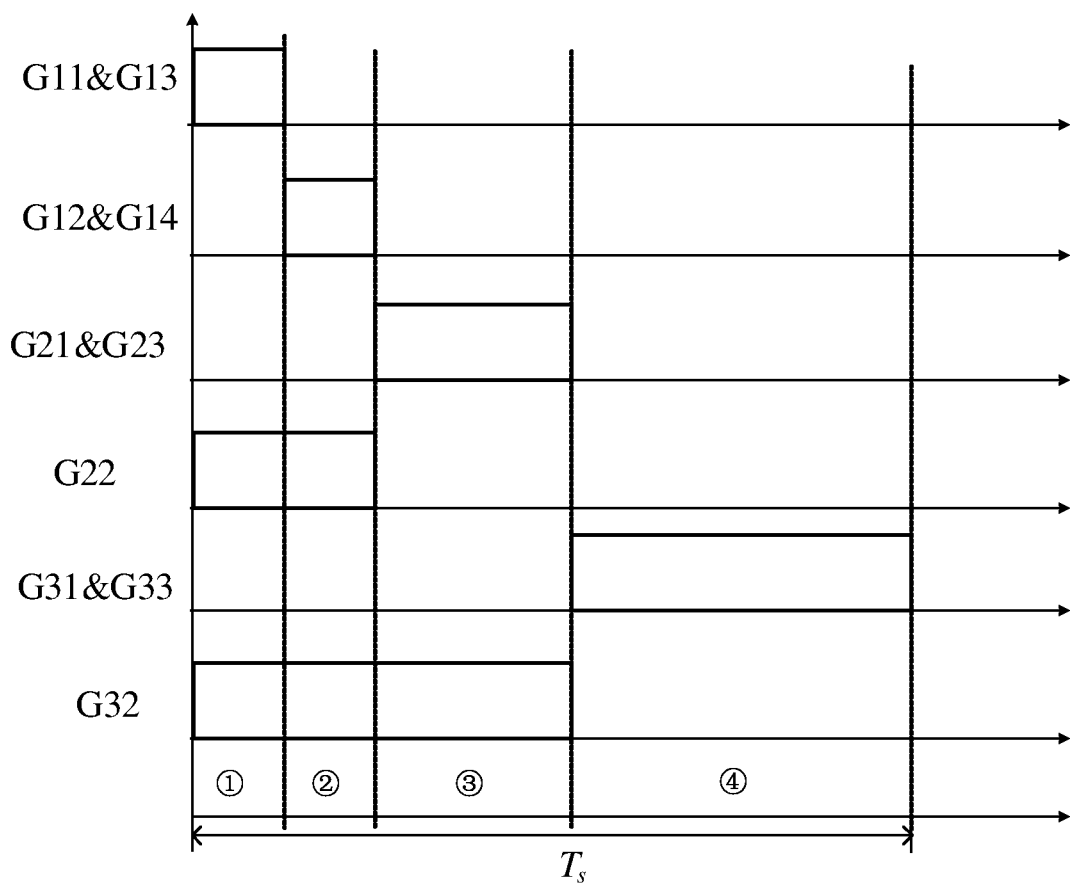
FIG. 5 is a waveform diagram of example operation of the voltage converter in the second example, in accordance with embodiments of the present invention.

Referring now to FIG. 5, shown is a waveform diagram of example operation of the voltage converter in the second example, in accordance with embodiments of the present invention. In this particular example, Gil and G13 are the control signals of first power switches Q11 and Q13, G12 and G14 are the control signals of first power switches Q12 and Q14, G21 and G23 are the control signals of second power switches Q21 and Q23, G22 is the control signal of second power switch Q22, G31 and G33 are the control signals of second power switches Q31 and Q33, G32 is the control signal of second power switch Q32, and switching period Ts can include four intervals ① to ④. The operating process of voltage converter in the second embodiment can be described with reference to FIGS. 4 and 5. As shown in FIG. 5, during interval ①, control signals G11, G13, G22, and G32 are high, first power switches Q11 and Q13 can be turned on, second power switches Q22 and Q32 can be turned on, and flying capacitor Cf1, flying capacitor Cf2, flying capacitor Cf3, and first energy storage element C1 can be connected in series to divide input voltage Vin; that is, VCf1+VCf2+VCf3+VC1=Vin.

During interval ②, control signals G12, G14, G22, and G32 are high, and first power switches Q12 and Q14, and second power switches Q22 and Q32 can be turned on. One terminal of flying capacitor Cf1 can connect to first intermediate node m11, and the other terminal of flying capacitor Cf1 may be grounded. One terminal of flying capacitor Cf2 can connect to first intermediate node m11, the other terminal of flying capacitor Cf2 can connect to one terminal of flying capacitor Cf3, the other terminal of flying capacitor Cf3 can connect to one terminal of first energy storage element C1, and the other terminal of first energy storage element C1 can be grounded. That is, the series-connection of flying capacitor Cf2, flying capacitor Cf3 and first energy storage element C1 can connect in parallel with flying capacitor Cf1, such that voltage VCf1 across flying capacitor Cf1 can be equal to the sum of voltage VCf2 across flying capacitor Cf2, voltage VC3 across third flying capacitor Cf3, and voltage VC1 across first energy storage element C1, and can also be equal to half the input voltage; that is, VCf1=V(Cf2+Cf3+C1)=1/2*Vin. In addition, the output voltage of the first switched capacitor circuit can be equal to the voltage at first intermediate node m12, and the voltage at first intermediate node m12 may be equal to the voltage across flying capacitor Cf1, such that the output voltage of the first switched capacitor circuit can be equal to voltage VCf1 across flying capacitor Cf1; that is, 1/2*Vin.

During interval ③, control signals G21, G23, and G32 are high, and second power switches Q21, Q23, and Q32 can be turned on. One terminal of flying capacitor Cf2 can connect to second intermediate node m21, and the other terminal of flying capacitor Cf2 may be grounded. One terminal of flying capacitor Cf3 can connect to second intermediate node m21, the other terminal of flying capacitor Cf3 can connect to one terminal of first energy storage element C1, and the other terminal of first energy storage element C1 can be grounded. That is, the series-connection of flying capacitor Cf3 and first energy storage element C1 can connect in parallel with flying capacitor Cf2, such that voltage VCf2 across flying capacitor Cf2 can be equal to the sum of voltage VCf3 across flying capacitor Cf3 and voltage VC1 across first energy storage element C1, and may also be equal to one quarter of the input voltage; that is, VCf2=(VCf3+VC1)=1/4*Vin. The output voltage of the second switched capacitor circuit can be equal to the voltage at second intermediate node m21, and the voltage at second intermediate node m21 can be equal to the voltage across flying capacitor Cf2, such that the output voltage of the second switched capacitor circuit can be equal to Voltage VCf2 across flying capacitor Cf2, which is equal to 1/4*Vin.

During interval ④, control signals G31 and G33 are high, and second power switches Q31 and Q33 can be turned on. One terminal of flying capacitor Cf3 can connect to second intermediate node m31, and the other terminal of flying capacitor Cf3 can be grounded. One terminal of first energy storage element C1 can connect to second intermediate node m31, and the other terminal of first energy storage element C1 can be grounded. That is, first energy storage element C1 and flying capacitor Cf3 can connect in parallel, such that voltage VCf3 across flying capacitor Cf3 can be equal to voltage VC1 across first energy storage element C1, and can also be equal to one-eighth the input voltage; that is, VCf3=VC1=1/8*Vin. In this example, during each switching cycle, the first switched capacitor circuit, the second switched capacitor circuit, and the third switched capacitor circuit may operate in a switched capacitor mode in sequence. The voltage converter can efficiently achieve 8:1 voltage conversion; that is, the ratio of input voltage Vin to output voltage Vout is 8:1. Also, 4 energy storage elements and 10 power switches may be required in the voltage converter, and when the voltage converter is packaged in the chip, only 8 pins may be required.

Figure 6:
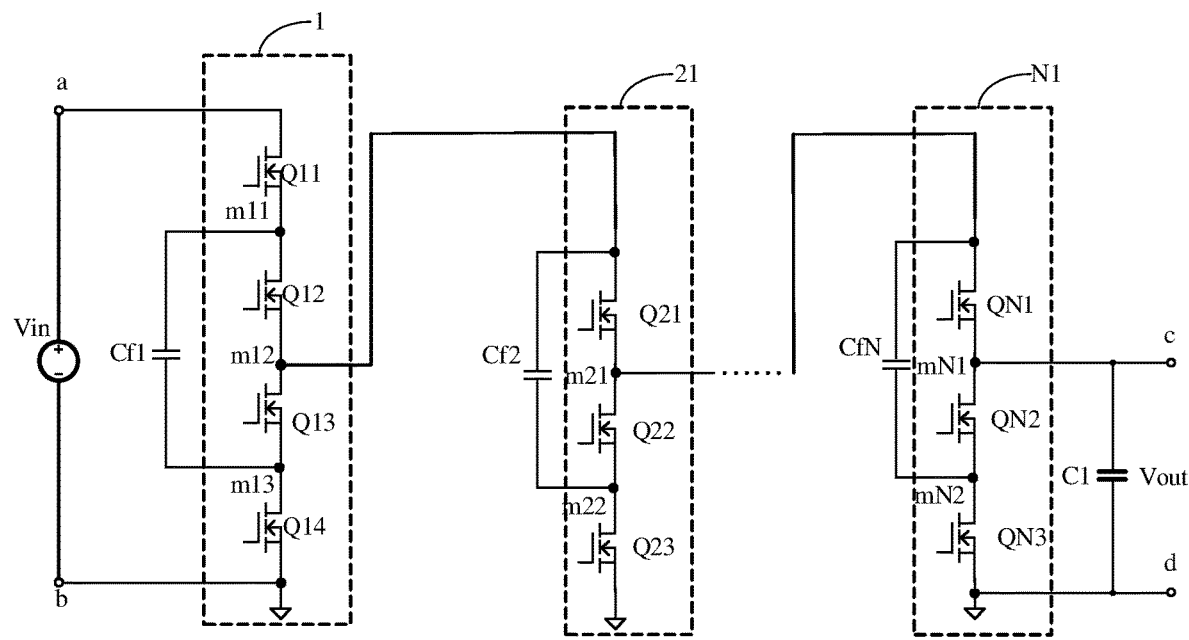
FIG. 6 is a schematic diagram of a third example voltage converter, in accordance with embodiments of the present invention.

Referring now to FIG. 6, shown is a schematic diagram of a third example voltage converter, in accordance with embodiments of the present invention. in this particular example, the voltage converter can include N switched capacitor circuits, and the N switched capacitor circuits can be sequentially connected in series between input end ab and output end cd, where N is a positive integer greater than 2. The first switched capacitor circuit can include flying capacitor Cf1 and switch circuit 1. Switch circuit 1 can include four first power switches Q11, Q12, Q13, and Q14, and first power switches Q11, Q12, Q13, and Q14 can be sequentially connected in series between high potential terminal a and low potential terminal b of the input end, such that three first intermediate nodes m11, m12, and m13 can be formed. Flying capacitor Cf1 can connect between first intermediate node m11 and first intermediate node m13. The high potential terminal of the output end of the first switched capacitor circuit can be configured as first intermediate node m12. Optionally, both the low potential terminals of the input end and the output end of the first switched capacitor circuit are grounded.

The i-th switched capacitor circuit can include a switch circuit and flying capacitor Cfi, the switch circuit of the i-th switched capacitor circuit can include first switch circuit i1, and first switch circuit i1 can include three second power switches Qi1, Qi2, and Qi3. Second power switches Qi1, Qi2, and Qi3 can be sequentially connected in series between the high potential terminal and the low potential terminal of the output end of the (i−1)-th switched capacitor circuit, such that two second intermediate nodes mi1 and mi2 may be formed. Flying capacitor Cfi can connect between the high potential terminal of the output end of the (i−1)-th switched capacitor circuit and second intermediate node mi2, and the high potential terminal of the output end of the i-th switched capacitor circuit can be configured as the first second intermediate node mi1, 2≤i≤N. Optionally, both the low potential terminals of the input end and the output end of the (i−1)-th switched capacitor circuit can be configured as ground potential terminals.

When the (i−1) th switched capacitor circuit operates in the switched capacitor mode, second power switches Qi2~QN2 can be always turned on. The flying capacitors Cfi-CfN of the i-th to the N-th switched capacitor circuits can be connected in series with first energy storage element C1 to be configured as the output capacitor of the (i−1)-th switched capacitor circuit. Further, when the i-th switched capacitor circuit operates in the switched capacitor mode, the switch circuit of the i-th switched capacitor circuit can multiplex part of the power switches in the switch circuit of the (i−1)-th switched capacitor circuit. Further, the switch circuit of the i-th switched capacitor circuit may not only include first switch circuit i1, but can also multiplex two power switches in the (i−1)-th switched capacitor circuit that are coupled to the high-potential terminal of its output end. When i=2, the switch circuit of the second switched capacitor circuit may not only include first switch circuit 21, but can also multiplex power switches Q12 and Q13 in switch circuit 1 of the first switched capacitor circuit. When i is greater than 2, the switch circuit of the i-th switched capacitor circuit may not only include first switch circuit i1, but can also multiplex power switches Q(i−1)1and Q(i−1)2 in first switch circuit (i−1)1 of the (i−1)-th switched capacitor circuit. By controlling the switching states of the power switches of the switch circuit of each switched capacitor circuit, the ratio of the output voltage to the input voltage is $1/2^N$.

In this example, the voltage converter can also include a control circuit, and the control circuit can control the switching states of the first power switches and the second power switches. In the n-th switched capacitor circuit, the switching states of second power switches Qn1 and Qn3 can be complementary to the switching states of second power switch Qn2. During the conduction period of second power switch Qn2 in the n-th switched capacitor circuit, the switching states of second power switches Q(n−1)1 and Q(n−1)3 in the (n−1)-th switched capacitor circuit can be complementary to the switching states of second power switch Q(n−1)2. During the conduction period of second power switch Q22 in the second switched capacitor circuit, the switching states of first power switches Q11 and Q13 can be complementary to the switching states of first power switches Q12 and Q14, 3≤n≤N.

In the n-th switched capacitor circuit, the switching states of second power switches Qn1 and Qn3 are the same, and the switching states of second power switches Qn1 and Qn3 can be complementary to the switching states of second power switch Qn2. During the conduction period of second power switch Qn2 in the n-th switched capacitor circuit, in the (n−1)-th switched capacitor circuit, the switching states of second power switches Q(n−1)1 and Q(n−1)3 are the same, and the switching states of the second power switches Q(n−1)1 and Q(n−1)3 may be complementary to the switching states of second power switch Q(n−1)2. During the conduction period of second power switch Q22 in the second switched capacitor circuit, the switching states of first power switches Q11 and Q13 can be the same, the switching states of first power switches Q11 and Q13 can be complementary to the switching states of first power switches Q12 and Q14.

In each switching cycle, the 1st to Nth switched capacitor circuits may operate in a switched capacitor mode in sequence, such that output voltage Vout of the voltage converter can be equal to $1/2^N*Vin$, and N is a positive integer greater than or equal to 2. In this example, the voltage converter can efficiently achieve $2^N:1$ voltage conversion; that is, the ratio of input voltage Vin to output voltage Vout is $2^N:1$. Also, N+1 energy storage elements and 3N+1 power switches can be required in the voltage converter. When the voltage converter of this embodiment is packaged in the chip, only 2+2N pins may be required, which reduces the cost and volume of the circuit. Under the condition of input voltage Vin being unchanged, by controlling the number N of the switched capacitor circuits, different output voltages can be obtained to meet the needs of different loads, and the output voltage of the j-th switched capacitor circuit can be equal to $1/2j*Vin$, j=1, 2, . . . , N.

In the above three examples, by sharing the power switches, each of the switched capacitor circuits can include four power switches, a flying capacitor, and an output capacitor, such that the ratio of the input voltage to the output voltage of each switched capacitor circuit is 2:1. In addition, the numbers of power switches, flying capacitors, and the connection methods of each switched capacitor circuit in the above three embodiments are not limited to the above examples. The function of enabling each switched capacitor circuit to complete the step-down function after the above-mentioned similar sharing can be included in particular embodiments.

In other embodiments, the first switched capacitor circuit can include M−1 first flying capacitors, and the switch circuit of the first switched capacitor circuit can include 2M first power switches, and the 2M first power switches can be sequentially connected in series between the high potential terminal and the low potential terminal of the input end, such that 2M−1 first intermediate nodes may be formed. The r-th first flying capacitor can connect between the r-th first intermediate node and the (2M−r)-th first intermediate node, and the high-potential terminal of the output end of the first switched capacitor circuit can be configured as the M-th first intermediate node, where M≥2, 1≤r≤M−1. The i-th switched capacitor circuit can include M−1 second flying capacitors, and the switch circuit of the i-th switched capacitor circuit can include 2M−1 second power switches. The 2M−1 second power switches can be sequentially connected in series between the high potential terminal and the low potential terminal of the output end of the (i−1)-th switched capacitor circuit, such that 2M−2 second intermediate nodes may be formed.

The first second flying capacitor can connect between the high potential terminal of the output end of the (i−1)-th switched capacitor circuit and the (2M−2)-th second intermediate node. The s-th second flying capacitor can connect between the (s−1)-th second intermediate node and the (2M−s−1)-th second intermediate node. The high-potential terminal of the output end of the i-th switched capacitor circuit can be configured as the (M−1)-th second intermediate node, where 2≤s≤M−1. By sharing the power switches in the above three embodiments, each switched capacitor circuit may include 2M power switches, M−1 flying capacitors and one output capacitor, such that the ratio of the input voltage to the output voltage of each switched capacitor circuit can be N:1.

Figure 7:
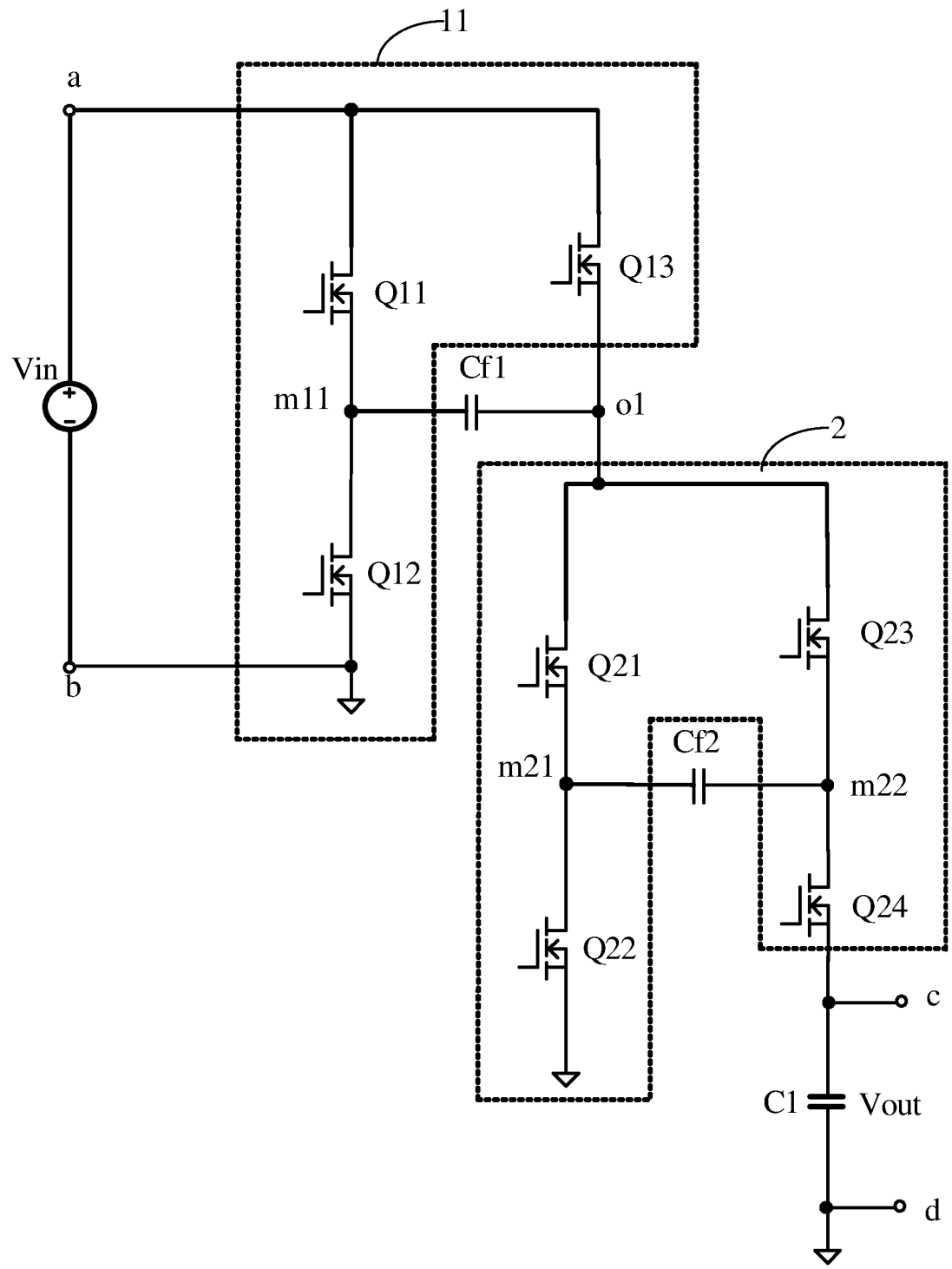
FIG. 7 is a schematic diagram of a fourth example voltage converter, in accordance with embodiments of the present invention.

Referring now to FIG. 7, shown is a schematic diagram of a fourth example voltage converter, in accordance with embodiments of the present invention. This particular example voltage converter can include input end ab, output end cd, two switched capacitor circuits, and first energy storage element C1. The input end can include high potential terminal a and low potential terminal b for receiving input voltage Vin, and the output end can include high potential terminal c and low potential terminal d for generating output voltage Vout. The two switched capacitors circuit may be sequentially connected in series between input end ab and output end cd. Also, first energy storage element C1 can be coupled to output end cd to generate output voltage Vout so as to drive the load. Here, low potential terminal b of the input end and low potential terminal d of the output end may be ground potential terminals.

The first switched capacitor circuit can include flying capacitor Cf1 and a switch circuit. The switch circuit of the first switched capacitor circuit can include three first power switches: Q11, Q12, and Q13. First power switches Q11 and Q12 can be sequentially connected in series between high potential terminal a and low potential terminal b of the input end. One terminal of power switch Q13 can connect to high potential terminal a, the other terminal of power switch Q13 can connect to one terminal of flying capacitor Cf1, and the other terminal of flying capacitor Cf1 can connect a common terminal of first power switches Q11 and Q12. The high potential terminal of the output end of the first switched capacitor circuit can be configured as common terminal o1 of flying capacitor Cf1 and first power switch Q13. Optionally, both the low potential terminals the input end and the output end of the first switched capacitor circuit can be configured as ground potential terminals.

The second switched capacitor circuit can include flying capacitor Cf2 and switch circuit 2, which can include four second power switches Q21, Q22, Q23, and Q24. Second power switches Q21 and Q22 can be sequentially connected in series between the high potential terminal (e.g., common terminal o1) and the low potential terminal of the output end of the first switched capacitor circuit. Second power switches Q23 and Q24 can be sequentially connected in series between the high potential terminal (e.g., common terminal o1) and high potential terminal c. Flying capacitor Cf2 can connect between common terminal m21 of second power switches Q21 and Q22 and common terminal m22 of second power switches Q23 and Q24. Optionally, both the low potential terminals the input end and the output end of the first switched capacitor circuit can be configured as ground potential terminals.

When the first switched capacitor circuit operates in the switched capacitor mode, the switch circuit of the first switched capacitor circuit can include first switch circuit 11, and multiplex all power switches in switch circuit 2 of the second switched capacitor circuit. In addition, during the operating process, flying capacitor Cf2, or the series-connection of flying capacitor Cf2 and first energy storage element C1, can be shared as the output capacitor of the first switched capacitor circuit. Further, when the second switched capacitor circuit operates in the switched capacitor mode, the output capacitor of the second switched capacitor circuit can be configured as first energy storage element C1. By controlling the switching states of the first power switches and the second power switches, voltage conversion between input end ab and output end cd can be achieved.

In this example, the voltage converter can also include a control circuit, and the control circuit can be configured to control the switching states of the first power switches and the second power switches. The switching states of first power switch Q11 can be complementary to the switching states of first power switches Q12 and Q13. Also, during the conduction period of second power switch Q11 in the first switched capacitor circuit, the switching states of second power switches Q21 and Q24 may be complementary to the switching states of second power switches Q22 and Q23. Further, in the first switched capacitor circuit, the switching states of first power switch Q12 can be same as that of second power switch Q13, and the switching states of first power switch Q11 can be complementary to the switching states of first power switches Q12 and Q13. During the conduction period of first power switch Q11 in the first switched capacitor circuit, the switching states of second power switches Q22 and Q23 may be the same in the second switched capacitor circuit, the switching states of second power switches Q21 and Q24 can be the same, and the switching states of second power switches Q21 and Q24 may be complementary to the switching states of second power switches Q22 and Q23.

Figure 8:
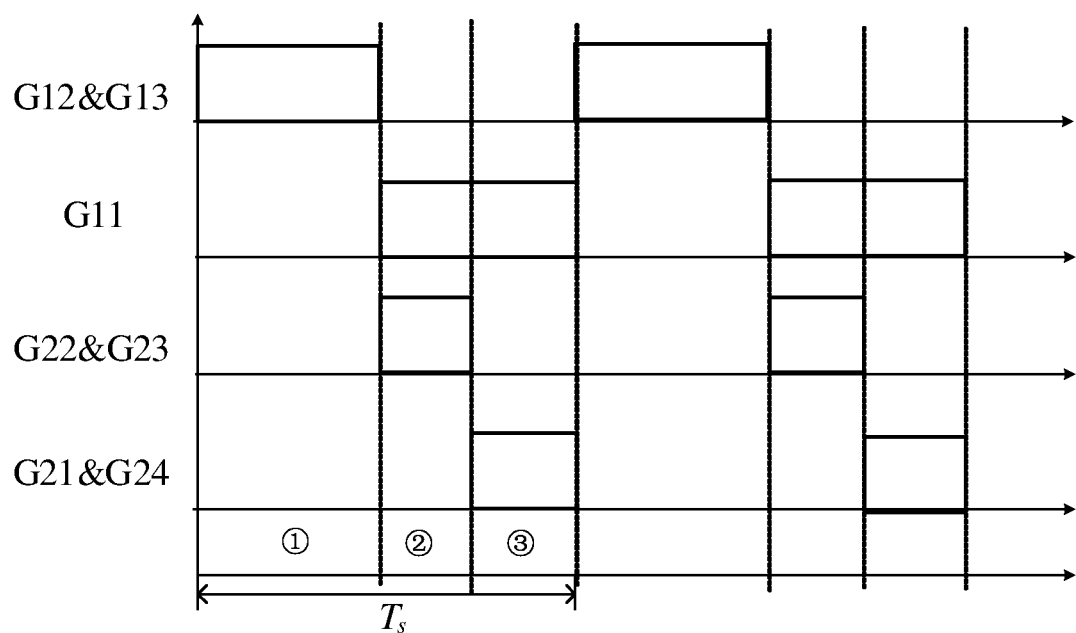
FIG. 8 is a waveform diagram of example operation of the voltage converter in the fourth example, in accordance with embodiments of the present invention.

Referring now to FIG. 8, shown is a waveform diagram of example operation of the voltage converter in the fourth example, in accordance with embodiments of the present invention. G12 and G13 are the control signals of first power switches Q12 and Q13, Gi1 is the control signal of first power switches Q11, G22 and G23 are the control signals of second power switches Q22 and Q23, and G21 and G24 are the control signals of second power switch Q21 and Q24. Switching period Ts can include three intervals ①~③. The operating process of voltage converter in this example can be described with reference to FIGS. 7 and 8. As shown in FIG. 8, during interval ①, control signals G12 and G13 are at a high level, first power switches Q12 and Q13 can be turned on, and input voltage Vin can charge flying capacitor Cf1. Voltage VCf1 of flying capacitor Cf1 can be equal to −Vin; that is, VCf1=−Vin. For convenience of description, when the voltage at common terminal m11 is greater than the voltage at common terminal o1, the voltage of flying capacitor Cf1 can be a positive value; otherwise, the voltage of flying capacitor Cf1 can be a negative value.

During interval ②, control signals G22, G23, and G11 are high, and first power switches Q11 and second power switches Q22 and Q23 can be turned on. Flying capacitor Cf1 and flying capacitor Cf2 can be connected in series to divide input voltage Vin, such that the difference between voltage VCf1 across flying capacitor Cf1 and voltage VCf2 across flying capacitor Cf2 can be equal to input voltage Vin; that is, VCf1−VCf2=Vin. When the voltage at common terminal m21 is greater than the voltage at common terminal m22, the voltage of flying capacitor Cf2 is a positive value; otherwise, the voltage of flying capacitor Cf2 is a negative value. The output voltage of the first switched capacitor circuit can be equal to the voltage at common terminal o1, and the voltage at common terminal o1 can be equal to the negative value of the voltage across flying capacitor Cf2, such that the output voltage of the first switched capacitor circuit can be equal to the negative value of voltage VCf2 across the capacitor Cf2; that is, 2*Vin.

During interval , control signals G11, G21, and G24 are at a high level, and first power switch Q11 and second power switches Q21 and Q24 can be turned on. Flying capacitor Cf1, flying capacitor Cf2, and first energy storage element C1 can connect in series to divide voltage Vin, such that the sum of voltage VCf1 across flying capacitor Cf1, voltage VCf2 across flying capacitor Cf2, and voltage VC1 across first energy storage element C1 can be equal to input voltage Vin. That is, VCf1+VCf2+VC1=Vin. In this way, voltage VC1 across first energy storage element C1 can be equal to four times the input voltage, that is, VC1=4Vin, and Vout=VC1=4Vin. In this example, during each switching cycle, the second switched capacitor circuit and the first switched capacitor circuit may operate in a switched capacitor mode in sequence. The voltage converter can efficiently achieve 1:4 voltage conversion; that is, the ratio of input voltage Vin to output voltage Vout is 1:4. In the voltage converter, 3 energy storage elements and 7 power switches may be required, and when the voltage converter is packaged in the chip, only 6 pins may be required, which may reduce the number of the components and pins, and accordingly circuit size and cost.

Figure 9:
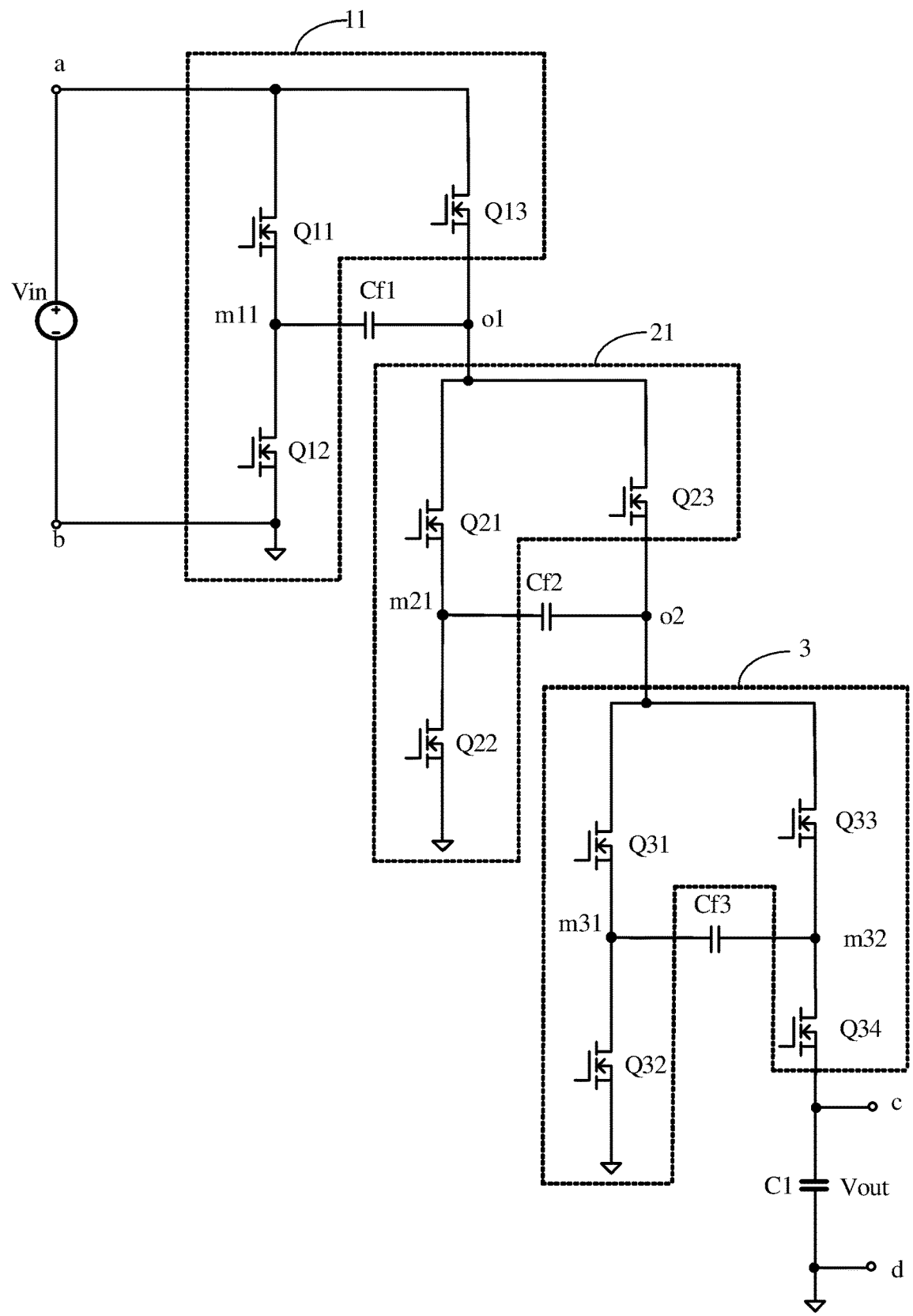
FIG. 9 is a schematic diagram of a fifth example voltage converter, in accordance with embodiments of the present invention.

Referring now to FIG. 9, shown is a schematic diagram of a fifth example voltage converter, in accordance with embodiments of the present invention. In this particular example, the voltage converter can include three switched capacitor circuits, and the three switched capacitor circuits can be sequentially connected in series between input end ab and output end cd. The first switched capacitor circuit can include flying capacitor Cf1 and a switch circuit, where the switch circuit of the first switched capacitor circuit can include first switch circuit 11. First switch circuit 11 can include three first power switches Q11, Q12, and Q13. First power switches Q11 and Q12 can be sequentially connected in series between high potential terminal a and low potential terminal b of the input end. One terminal of first power switch Q13 can connect to high potential terminal a of the input end, the other terminal of first power switch Q13 can connect to one terminal of flying capacitor Cf1, and the other terminal of flying capacitor Cf1 can connect to common terminal m11 of first power switches Q11 and Q12. The high-potential terminal of the output end of the first switched capacitor circuit can be configured as common terminal o1 of flying capacitor Cf1 and first power switch Q13. Optionally, both the low potential terminals of the output end the input end of the first switched capacitor circuit can be ground potential terminals.

The second switched capacitor circuit can include flying capacitor Cf2 and a switch circuit. The switch circuit of the second switched capacitor circuit can include first switch circuit 21, and first switch circuit 21 can include three first power switches Q21, Q22, and Q23. First power switches Q21 and Q22 can be sequentially connected in series between the high potential terminal (e.g., common terminal o1) and the low potential terminal of the output end of the first switched capacitor circuit. One terminal of first power switch Q23 can connect to the high potential terminal (e.g., common terminal o1) of the output end of the first switched capacitor circuit, the other terminal of first power switch Q23 can connect to one terminal of flying capacitor Cf2, and the other terminal of flying capacitor Cf2 can connect to common terminal m21 of power switches Q21 and Q22. The high potential terminal of the output end of the second switched capacitor circuit can be configured as common terminal o2 of flying capacitor Cf2 and first power switch Q23. Optionally, both the low potential terminals of the output end of the input end of the second switched capacitor circuit can be configured as ground potential terminals.

The third switched capacitor circuit can include flying capacitor Cf3 and switch circuit 3. Switch circuit 3 can include four second power switches: Q31, Q32, Q33, and Q34. Second power switches Q31 and Q32 can be sequentially connected in series between the high-potential terminal (e.g., common terminal o2) and the low-potential terminal of the output end of the second switched capacitor circuits. Second power switches Q33 and Q34 can be sequentially connected in series between the high-potential terminal of the output end of the second switched capacitor circuit (e.g., common terminal o2) and high potential terminal c. Flying capacitor Cf3 can connect between common terminal m31 of second power switches Q31 and Q32 and common terminal m32 of second power switches Q33 and Q34. Optionally, both the low potential terminals of the output end and the input end of the third switched capacitor circuit can be configured as ground potential terminals.

When the first switched capacitor circuit operates in the switched capacitor mode, the switch circuit of the first switched capacitor circuit may not only include first switch circuit 11, but can also multiplex all the power switches of the switch circuit in the second switched capacitor circuit. In this example, the output capacitor of the first switched capacitor circuit can be configured as flying capacitor Cf2, or the series-connection of flying capacitor Cf2 and flying capacitor Cf3, or the series-connection of flying capacitor Cf2, flying capacitor Cf3, and first energy storage element.

When the second switched capacitor circuit operates in the switched capacitor mode, the switch circuit of the second switched capacitor circuit may not only include first switch circuit 21, but can also multiplex all the power switches of switch circuit 3 in the third switched capacitor circuit. The output capacitor of the second switched capacitor can be configured as flying capacitor Cf3, or the series-connection of flying capacitor Cf3 and first energy storage element C1. When the third switched capacitor circuit operates in the switched capacitor mode, the output capacitor of the third switched capacitor can be configured as first energy storage element C1.

In this example, the voltage converter can also include a control circuit, and the control circuit can control the switching states of the first power switches and the second power switches. In the first switched capacitor circuit, the switching states of first power switch Q11 can be complementary to the switching states of first power switches Q12 and Q13. During the conduction period of first power switch Q11 in the first switched capacitor circuit, the switching states of first power switch Q21 can be complementary to the switching states of first power switches Q22 and Q23. During the conduction period of first power switch Q21 in the second switched capacitor circuit, the switching states of power switches Q31 and Q34 in the third switched capacitor circuit can be complementary to the switching states of second power switches Q32 and Q33.

In the first switched capacitor circuit, the switching states of first power switch Q12 and second power switch Q13 may be the same, and the switching states of first power switch Q11 can be complementary to the switching states of first power switches Q12 and Q13. During the conduction period of the first power switch Q11 in the first switched capacitor circuit, the switching states of the first power switch Q22 and the second power switch Q23 in the second switched capacitor circuit may be the same, and the switching states of the first power switch Q21 can be complementary to the switching states of the first power switches Q22 and Q23. During the conduction period of the first power switch Q21 in the second switched capacitor circuit, the switching states of the second power switches Q32 and Q33 in the third switched capacitor circuit may be the same, the switching states of the second power switches Q31 and Q34 can be the same, and the switching states of the second power switches Q31 and Q34 and be complementary to the switching states of the second power switches Q32 and Q33.

Figure 10:
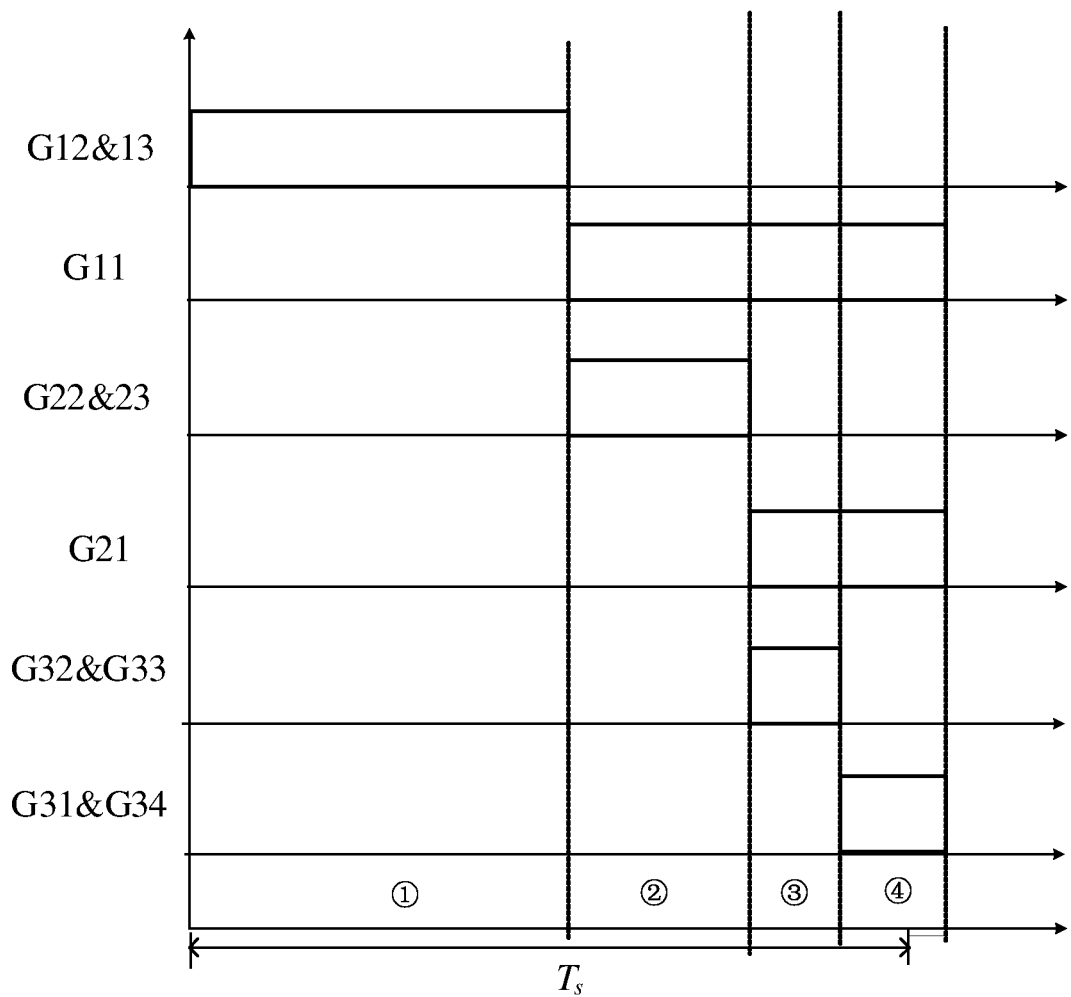
FIG. 10 is a waveform diagram of example operation of the voltage converter in the fifth example, in accordance with embodiments of the present invention.

Referring now to FIG. 10, shown is a waveform diagram of example operation of the voltage converter in the fifth example, in accordance with embodiments of the present invention. In this particular example, G12 and G13 are the control signals of first power switches Q12 and Q13, Gi1 is the control signal of first power switch Q11, G22 and G23 are the control signals of first power switches Q22 and Q23, G21 is the control signal of first power switch Q21, and G32 and G33 are the control signals of second power switches Q32 and Q33, G31 and G34 are the control signals of second power switches Q31 and Q34. Switching period Ts can include four intervals ①-④.

The operating process of voltage converter in the fifth embodiment can be described with reference to FIGS. 9 and 10. As shown in FIG. 10, during interval ①, control signals G12 and G13 are high, the first power switches Q12 and Q13 can be turned on. Input voltage Vin can charge flying capacitor Cf1, and voltage VCf1 of flying capacitor Cf1 can be equal to -Vin; that is, VCf1=-Vin. For the convenience of description, when the voltage at common terminal m11 is greater than the voltage at common terminal o1, the voltage across flying capacitor Cf1 can be a positive value; otherwise, the voltage across flying capacitor Cf1 can be a negative value.

During interval ②, control signals Gi1 and G22 and G23 are at a high level, first power switches Q11, Q22 and Q23 can be turned on. Flying capacitors Cf1 and Cf2 can connect in series to divide input voltage Vin, such that the difference between voltage VCf1 across flying capacitor Cf1 and voltage VCf2 across flying capacitor Cf2 can be equal to input voltage Vin; that is, VCf1-VCf2=Vin, and VCf2=-2Vin. When the voltage at common terminal m21 is greater than the voltage at common terminal o2, the voltage across flying capacitor Cf2 can be a positive value; otherwise, the voltage across flying capacitor Cf2 can be a negative value. When the output voltage of the first switched capacitor circuit is equal to the voltage at common terminal o1, the voltage at common terminal o1 can be equal to the negative value of the voltage across flying capacitor Cf2, such that the output voltage of the first switched capacitor circuit can be equal to the negative value of the voltage across flying capacitor Cf2; that is, 2*Vin.

During interval ③, control signals G11, G21, G32, and G33 are high, first power switches Q11 and Q21, and second power switches Q32 and Q33 can be turned on. The difference between the sum of voltage VCf1 across flying capacitor Cf1 and voltage VCf2 across flying capacitor Cf2 and voltage VCf3 across flying capacitor Cf3 can be equal to input voltage Vin, that is, VCf1+VCf2-VCf3=Vin; thus VCf3=-4Vin. When the voltage at common terminal m31 is greater than the voltage at common terminal m32, the voltage of flying capacitor Cf3 is a positive value; otherwise, the voltage of flying capacitor Cf3 is a negative value. The output voltage of the second switched capacitor circuit can be equal to the voltage at common terminal o2, and the voltage at common terminal o2 can be equal to the negative value of the voltage across flying capacitor Cf3, such that the output voltage of the second switched capacitor circuit can be equal to the negative value of the voltage across flying capacitor Cf3, that is, 4*Vin.

During interval ④, control signals G11, G21, G31, and G34 are high, first power switches Q11 and Q21, and second power switches Q31 and Q34 can be turned on. At this time, flying capacitors Cf1, Cf2, Cf3 and first energy storage component C1 can connect in series in order to divide input voltage Vin. The sum of the voltages across flying capacitors Cf1, Cf2, Cf3 and first energy storage component C1 can be equal to input voltage Vin; that is, VCf1+VCf2+VCf3+VC1=Vin, and thus VC1=8Vin, and output voltage Vout=VC1=8Vin. In this example, during each switching cycle, the third switched capacitor circuit, the second switched capacitor circuit, and the first switched capacitor circuit, may operate in a switched capacitor mode in sequence. The voltage converter can efficiently achieve 1:8 voltage conversion; that is, the ratio of input voltage Vin to output voltage Vout is 1:8. In the voltage converter, 4 energy storage elements and 10 power switches may be required, and when the voltage converter is packaged in the chip, only 8 pins may be required, which can reduce the number of the components and pins, and accordingly reduce circuit size and cost.

Figure 11:
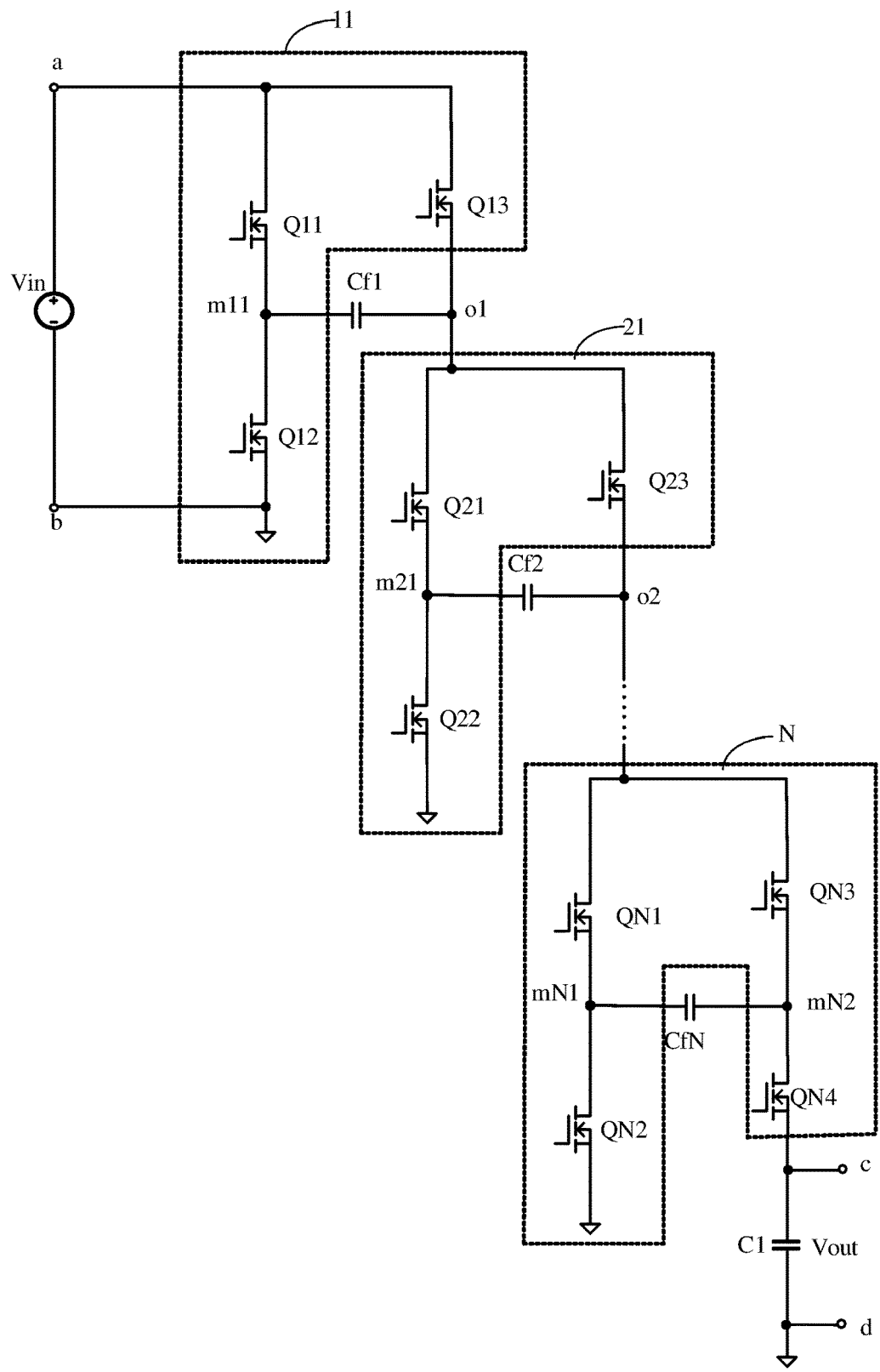
FIG. 11 is a schematic diagram of a sixth example voltage converter, in accordance with embodiments of the present invention.

Referring now to FIG. 11, shown is a schematic diagram of a sixth example voltage converter, in accordance with embodiments of the present invention. In this particular example, the voltage converter can include N switched capacitor circuits, and the N switched capacitor circuits can be sequentially connected in series between input end ab and output end cd, and N is greater than 2. The (i-1)-th switched capacitor circuit can include a switch circuit and flying capacitor Cf(i-1), and the switch circuit of the (i-1)-th switched capacitor circuit can include first switch circuit (i-1)1. First switch circuit (i-1)1 can include first power switches Q(i-1)1, Q(i-1)2, and Q(i-1)3. First power switches Q(i-1)1 and Q(i-1)2 can be sequentially connected in series between the high potential terminal and the low potential terminal of the input end of the (i-1)-th switched capacitor circuit.

One terminal of first power switch Q(i-1)3 can connect to the high potential terminal of the input end of the (i-1)-th switched capacitor circuit, and the other terminal of first power switch Q(i-1)3 can connect to one terminal of flying capacitor Cf(i-1), and the other terminal of flying capacitor Cf(i-1) can connect to common terminal m(i-1)1 of first power switches Q(i-1)2 and Q(i-1)1. The high potential terminal of the output end of the (i-1)-th switched capacitor circuit can be configured as common terminal o(i-1) of flying capacitor Cf(i-1) and first power switch Q(i-1)3. Optionally, both the low potential terminals of the output end and the input end of the (i-1)-th switched capacitor circuit can be configured as ground potential terminals.

The input terminal of the first switched capacitor circuit can connect to input end ab, and the input end of the i-th switched capacitor circuit can connect the output end of the (i-1)-th switch circuit, 2≤i≤N. The N-th switched capacitor circuit can include flying capacitor CfN and switch circuit N. switch circuit N can include four second power switches QN1, QN2, QN3, and QN4. The second power switches QN1 and QN2 can be sequentially connected in series between the high potential terminal (e.g., common terminal o(N−1)) and the low potential terminal of the output end of the (N−1)-th switched capacitor circuits. Second power switches QN3 and QN4 can be sequentially connected in series between the high potential terminal (e.g., common terminal o(N−1)) of the output end of the (N−1)-th switched capacitor circuit and high potential terminal c of the output end. Flying capacitor CfN can connect between common terminal mN1 of second power switches QN1 and QN2 and common terminal mN2 of second power switches QN3 and QN4. Optionally, both the low potential terminals of the output end and the input end of the N-th switched capacitor circuit can be configured as ground potential terminals.

When the (i−1)-th switched capacitor circuit operates in the switched capacitor mode, the switch circuit of the (i−1)-th switched capacitor circuit may not only include first switch circuit (i−1)1, but can also multiplex all power switches in the switch circuit of the i-th switched capacitor circuit. During the operating process, the output capacitor of the (i−1)-th switched capacitor circuit can be configured as the flying capacitor of the i-th switched capacitor circuit, or the series-connection of the flying capacitors of the i-th to the m-th switched capacitor circuit, or the series-connection of the flying capacitors of the i-th to the m-th switched capacitor circuit and the first energy storage element, i+1≤m≤N. When the N-th switched capacitor circuit operates in the switched capacitor mode, the output capacitor of the N-th switched capacitor circuit can be configured as first energy storage element C1. By controlling the switching state of the power switches of the switch circuit in each switched capacitor circuit, the ratio of the output voltage to the input voltage is $2^N$.

In this example, the voltage converter can also include a control circuit, and the control circuit can be configured to control the switching states of the first power switches and the second power switches. In the p-th switched capacitor circuit, the switching states of first power switch Qp1 can be complementary to the switching states of power switches Qp2 and Qp3. During the conduction period of first power switch Qp1 in the p-th switched capacitor circuit, the switching states of first power switch Q(p+1)1 can be complementary to the switching states of first power switches Q(p+1)2 and Q(p+1)3. During the conduction period of first power switch Q(N−1)1 in the (N−1)-th switched capacitor circuits, the switching states of second power switches QN1 and QN4 can be complementary to the switching states of second power switches QN2 and QN3, and 1'≤p≤N−2.

In the p-th switched capacitor circuit, the switching states of first power switches Qp2 and Qp3 are the same, and the switching states of first power switch Qp1 can be complementary to the switching states of first power switches Qp2 and Qp3. During the conduction period of first power switch Qp1 in the p-th switched capacitor circuit, the switching states of first power switches Q(p+1)2 and Q(p+1)3 in the (p+1)-th switched capacitor circuit may be the same, and the switching states of first power switch Q(p+1)1 can be complementary to the switching states of first power switches Q(p+1)2 and Q(p+1)3. In addition, during the conduction period of first power switch Q(N−1)1 in the (N−1)-th switched capacitor circuit, the switching states second power switches QN1 and QN4 in the N-th switched capacitor circuit may be the same, and the switching states of second power switches QN2 and QN3 can be the same. Also, the switching states of the first and fourth second power switches QN1 and QN4 can be complementary to the switching states of second power switches QN2 and QN3.

In each switching cycle, the N-th to the first switched capacitor circuits may operate in a switched capacitor mode in sequence. By adopting the control method above, the output voltage of the voltage converter can be $2^N*Vin$, where N is a positive integer greater than 1. The voltage converter can efficiently achieve the $1:2^N$ voltage conversion; that is, the ratio of input voltage Vin to output voltage Vout is $1:2^N$. Only N+1 energy storage elements and 3N+1 power switches may be be required in this example voltage converter, and when this voltage converter is packaged in a chip, only 2N+2 pins may be required, which can reduce the cost and volume of the circuit.

Under the condition of input voltage Vin being unchanged, by controlling the number N of the switched capacitor circuits, different output voltages can be obtained in order to meet the needs of different loads, and the output voltage of the j-th switched capacitor circuit can be equal to $1/2^j*Vin$, j=1, 2, . . . , N. The number of the power switches, the number of flying capacitors, and the connection method of each switched capacitor circuit in the above-mentioned embodiments are not limited to the above particular structure. By adopting the above-mentioned sharing, the function of each switched capacitor circuit to achieve the boosting function can be included in certain embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A voltage converter, comprising:
   a) an input end configured to receive an input voltage;
   b) an output end configured to generate an output voltage;
   c) N switched capacitor circuits sequentially coupled in series between the input end and the output end, wherein N is a positive integer greater than or equal to 2;
   d) wherein each switched capacitor circuit comprises a switch circuit and a flying capacitor, and at least the flying capacitor of an i-th switched capacitor circuit is configured as an output capacitor of an (i−1)-th switched capacitor circuit, wherein i is a positive integer that is greater than or equal to 2 and less than or equal to N;
   e) a first energy storage element coupled to the output end; and
   f) wherein the switch circuit of the (i−1)-th switched capacitor circuit comprises three first power switches, wherein the first and second first power switches are sequentially connected in series between a high potential terminal and a low potential terminal of an input end of the (i−1)-th switched capacitor circuit, wherein one terminal of the third first power switch is coupled to the high potential terminal of the input end of the (i−1)-th switched capacitor circuit, and the other terminal of the third first power switch is coupled to one terminal of the flying capacitor of the (i−1)-th switched capacitor circuit, the other terminal of the flying capacitor of the (i−1)-th switched capacitor circuit is coupled to a common terminal of the first and second first power switches, and wherein the high potential terminal the output end of the (i−1)-th switched capacitor circuit is configured as a common terminal of the flying capacitor of the (i−1)-th switched capacitor circuit and the third first power switch.

2. The voltage converter according to claim 1, wherein in each switching cycle, N switched capacitor circuits operate in a switched capacitor mode in sequence.

3. The voltage converter according to claim 2, wherein in each switching cycle, the first to the N-th switched capacitor circuits operate in a switched capacitor mode in sequence.

4. The voltage converter according to claim 2, wherein in each switching cycle, the N-th to the first switched capacitor circuits operate in a switched capacitor mode in sequence.

5. The voltage converter according to claim 1, wherein by controlling the switching states of the power switches of the switch circuit in each switched capacitor circuit, the ratio of the output voltage to the input voltage is $1/2^N$ or $2^N$.

6. The voltage converter according to claim 1, wherein the switch circuit of the N-th switched capacitor circuit comprises four second power switches, wherein:
   a) the first and second second power switches are sequentially connected in series between the high potential terminal and the low potential terminal of the input end of the N-th switched capacitor circuit;
   b) the third and the fourth second power switches are sequentially connected in series between the high potential terminal of the input end of the N-th switched capacitor circuit and the high potential terminal of the output end; and
   c) the flying capacitor of the N-th switched capacitor circuit is coupled to between a common terminal of the first and second power switches and a common terminal of the third and fourth second power switches.

7. The voltage converter according to claim 6, wherein when N=2:
   a) the switching states of the first first power switch are complementary to the switching states of the second and third first power switches, and during a conduction period of the first first power switch; and
   b) the switching states of the first and fourth second power switches are complementary to the switching states of the second and third second power switches.

8. The voltage converter according to claim 7, wherein the switching states of the second and third first power switches are the same, and the switching states of the first first power switch are complementary to that of the second and third first power switches.

9. The voltage converter according to claim 7, wherein the switching states of the first and fourth second power switches are the same, and the switching states of the second and third second power switches are the same, and the switching states of the first and fourth first power switches are complementary to the switching states of the second and third first power switches.

10. The voltage converter according to claim 6, wherein when N=2:
   a) the switching states of the first first power switch are complementary to the switching states of the second and third first power switches in the p-th switched capacitor circuit;
   b) during a conduction period of the first first power switch in the p-th switched capacitor circuit, the switching states of the first first power switch are complementary to the switching states of the second and third first power switches in the (p+1)-th switched capacitor circuit;
   c) during a conduction period of the first first power switch in the (N−1)-th switched capacitor circuit, the switching states of the first and fourth second power switches in the N-th switched capacitor circuit are complementary to the switching states of the second and third second power switches in the N-th switched capacitor circuit; and
   d) wherein $1 \leq p \leq N-2$.

11. The voltage converter according to claim 10, wherein the switching states of the second and third first power switches are the same, and the switching states of the first first power switch are complementary to that of the second and third first power switches.

12. The voltage converter according to claim 10, wherein the switching states of the first and fourth second power switches are the same, and the switching states of the second and third second power switches are the same, and the switching states of the first and fourth first power switches are complementary to the switching states of the second and third first power switches.

13. The voltage converter according to claim 1, wherein low potential terminals of the output end and the input end of the switched capacitor circuit are all ground potential terminals.

14. The voltage converter according to claim 1, wherein the switch circuit of the (i−1)-th switched capacitor circuit multiplexes all power switches in the switch circuit of the i-th switched capacitor circuit.

* * * * *